United States Patent
Williams (10) Patent No.: US 10,998,946 B2
(45) Date of Patent: May 4, 2021

(54) MINIMIZING UPLINK AND DOWNLINK INTERFERENCE IN MOBILE NETWORK CONNECTED DRONES

(71) Applicant: T-MOBILE USA, INC., Bellevue, WA (US)

(72) Inventor: Carl Williams, Bellevue, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/560,663

(22) Filed: Sep. 4, 2019

(65) Prior Publication Data

US 2021/0067206 A1  Mar. 4, 2021

(51) Int. Cl.
| | |
|---|---|
| *H04L 25/08* | (2006.01) |
| *H04L 1/02* | (2006.01) |
| *H04B 7/0426* | (2017.01) |
| *H04B 7/08* | (2006.01) |
| *H04B 17/336* | (2015.01) |
| *H04B 17/327* | (2015.01) |

(52) U.S. Cl.
CPC ............ *H04B 7/043* (2013.01); *H04B 7/086* (2013.01); *H04B 7/0857* (2013.01); *H04B 17/327* (2015.01); *H04B 17/336* (2015.01)

(58) Field of Classification Search
CPC .... H04B 7/043; H04B 17/327; H04B 17/336; H04B 7/0857; H04B 7/086
USPC ............... 375/267, 285, 296, 346, 299, 347; 455/101, 132
See application file for complete search history.

(56) References Cited

U.S. PATENT DOCUMENTS

| | | | |
|---|---|---|---|
| 10,536,214 B2* | 1/2020 | Wu | H04B 17/318 |
| 2017/0163336 A1 | 6/2017 | Jalali et al. | |
| 2019/0045406 A1 | 2/2019 | Kalathil et al. | |
| 2019/0306675 A1* | 10/2019 | Xue | H04W 4/40 |
| 2020/0187151 A1* | 6/2020 | Wang | H04W 64/006 |
| 2020/0252941 A1* | 8/2020 | Schmidt | H04W 36/16 |

OTHER PUBLICATIONS

"DL Interference Mitigation for Aerial Vehicles", Agenda Item 6.2.7.2, 15 pp., Sequans Communications, 3rd Generation Partnership Project (3GPP), TSG-RAN WG1 #91, Reno, Nevada, USA (Dec. 1, 2017).
"Interference Mitigation for Aerial Vehicles", Agenda Item, 5.2.8.1, 14 pp., 3rd Generation Partnership Project (3GPP), TSG-RAN WG1 #90, Prague, P.R. Czechia (Aug. 21-25, 2017), Sequans Communications.
European Patent Application No. 20194670.4, Extended European Search Report, dated Jan. 29, 2021.

* cited by examiner

*Primary Examiner* — Tesfaldet Bocure
(74) *Attorney, Agent, or Firm* — Marshall, Gerstein & Borun LLP (57) ABSTRACT

A drone capable of bidirectional communication and control over a cellular network is provided with a signal interference minimization controller configured to periodically scan for neighboring serving cells and determine if beamforming adjustments and/or gain adjustments can be made to an antenna assembly to minimize interference experienced by the drone, in particular interference experienced during travel above the sightlines of base stations defining the network.

20 Claims, 11 Drawing Sheets

FIG. 9

MINIMIZING UPLINK AND DOWNLINK INTERFERENCE IN MOBILE NETWORK CONNECTED DRONES

FIELD OF DISCLOSURE

The present disclosure generally relates to systems and methods for operating drones over a cellular network and more specifically relates to minimizing uplink and downlink interference experienced by a drone operating over a cellular network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The introduction of unmanned aerial vehicles, commonly known as drones, has led to the creation of many useful applications. Drones do not require on-board pilots. Drones can travel great distances with highly-accurate flight patterns and to near pinpoint locations. Drones can be implemented in configurations that allow for a remote operator flight control and configurations that offer partially- or fully-autonomous flight. The applications of use are vast. In rural areas, for example in parts of Africa, drones are utilized in agriculture and medical deliveries. In the United States, shipping and distribution companies such as Amazon Inc. are exploring options to utilize drones for package delivery.

An advantage of drone technology—and an aspect that allows for such varied applications—is that drones can be deployed via different types of communication networks. Some drone applications may use satellite communication. Others may use terrestrial networks, such as mobile cellular networks. Indeed, some have proposed using mobile cellular networks as a way of providing drone connectivity and control beyond the visual range limitations of remote-human controlled drone. Using a mobile cellular network can extend the delivery reach of a drone, while maintaining more accurate control and more accurate monitoring of drone position, status, and activity, compared to both satellite communication and purely ground based systems.

There are, however, challenges in implementing drones in mobile cellular networks, especially as one attempts to scale up the number of drones. One challenge with utilizing a mobile cellular network, for example, is connecting to the network at heights above building and tree clutter/obstructions. As is well known, in cellular networks, buildings and other obstructions increase uplink and downlink pathloss, which limits interference. For drone applications, by contrast, a drone flight path may well be above such obstructions, which increases interference. This interference results in drops in data transmission to and from a mobile phone, for example. With no obstructions, free space path loss is the only method of attenuation that can affect a radio wave. However, at the same time, flight paths that are high enough will expose a drone to signals from multiple different radio base stations cells, even cells that are a significant distance away. Each base station and associated cells are designed to serve a specific geographic area. But, in contrast to mobile phones which are generally used below clutter, by flying above clutter, drones will detect numerous base stations and different cellular cells during flight. That reduces the effective cell coverage per cell for a drone and exposes drones to large areas of downlink interference, as compared with radio coverage to devices on the ground like mobile cellular phones.

There is, as a result, a need for minimizing uplink and downlink interference with drones operated by mobile cellular networks.

SUMMARY

As described further herein, the disclosure generally relates to systems, methods, and non-transitory computer-readable media storing instructions for minimizing signal interference of a drone operating on a cellular network.

In an embodiment, a method for minimizing signal interference of a drone operating on a cellular network is disclosed. Such method may include the following: scanning for a plurality of downlink signals using one or more antennas of the drone, each received downlink signal being received from a different base station of the cellular network, each base station defining a serving cell for the cellular network; determining a downlink signal characteristic for each of the plurality of downlink signals received at the drone; performing a downlink interference minimization process using the downlink signal characteristics of the plurality of downlink signals received at the drone; and/or determining when a change to a beamsteering configuration of the drone will result in a reduction of signal interference and updating the beamsteering configuration in response to the determination.

In another embodiment, a non-transitory, tangible computer-readable medium storing machine readable instructions for minimizing signal interference of a drone operating on a cellular network is disclosed. When executed by one or more processors, such instructions may cause the processors to: scan for a plurality of downlink signals, each received downlink signal being received from a different base station of the cellular network, each base station defining a serving cell for the cellular network; determine a downlink signal characteristic for each of the plurality of downlink signals received at the drone; perform a downlink interference minimization process using the downlink signal characteristics of the plurality of downlink signals received at the drone; and/or determine when a change to a beamsteering configuration of the drone will result in a reduction of signal interference and update the beamsteering configuration in response to the determination.

In another embodiment, a system for minimizing signal interference of a drone operating on a cellular network is disclosed. Such system may include one or more processors and a memory storing machine readable instructions. When executed by one or more processors, such instructions may cause the processors to: scan for a plurality of downlink signals, each received downlink signal being received from a different base station of the cellular network, each base station defining a serving cell for the cellular network; determine a downlink signal characteristic for each of the plurality of downlink signals received at the drone; perform a downlink interference minimization process using the downlink signal characteristics of the plurality of downlink signals received at the drone; and/or determine when a change to a beamsteering configuration of the drone will result in a reduction of signal interference and update the beamsteering configuration in response to the determination.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Generally, techniques described herein provide systems and methods for minimizing interference experienced by drones or other unmanned aerial vehicles that are navigated using a ground based wireless communication network, such as a cellular network. Systems and devices for implementing these techniques are also described. The described techniques allow a drone to monitor for interference on any received downlink paths, i.e., interference resulting from signals communicated by any base stations within a receiving range of the drone, including, importantly, base stations sending unintended signals received at the drone. The techniques allow the drone to analyze the received signals and performing beamforming and/or gain adjustments on an uplink/downlink path to minimize this interference, for example, by using interference minimization to switch serving cell or to enhance signal reception in a given serving cell. Implemented in an example drone device, these techniques allow drones to operate much more efficiently, especially on flight patterns above the sightlines of base stations, where signal interference is considerably greater than that experienced by the mobile devices typically served by the cellular network, which operate below such sightlines.

As described further below, techniques for minimizing signal interference for drones operating on cellular communication networks are described, which may include scanning for a plurality of downlink signals using one or more antennas of the drone, each received downlink being received from a different base station of the cellular network, each base station defining a serving cell for the cellular network; determining a downlink signal characteristic for each of the plurality of downlink signals received at the drone; performing a downlink interference minimization process using the downlink signal characteristics of the plurality of downlink signals received at the drone; and determining when a change to a beamsteering configuration of the drone will result in a reduction of signal interference and updating the beamsteering configuration in response to the determination. The downlink signal characteristic may be any one or more of the following: reference signal received power (RSRP), received signal strength indicator (RSSI), reference signal received quality (RSRQ), or signal-to-interference-plus-noise ratio (SINR).

In some embodiments, the drone may be configured with a delivery mode in which the drone is configured for bidirectional communication with a first base station using a first beamsteering configuration. Thus, the techniques may include switching the drone to a scanning mode, in which scanning for the plurality of downlink signals is performed. Updating the beamsteering configuration may then configure the drone for bidirectional communication with a second base station, different than the first base station using a second beamsteering configuration. Updating the beamsteering configuration may include switching a beamsteering configuration of a radio transceiver of the drone from a first antenna panel corresponding to a first primary direction to a second antenna panel corresponding to a second primary direction different than the first primary direction. In further embodiments, performing the downlink interference minimization may include performing a nearest neighbor optimization on the plurality of downlink signals received from the different base stations to identify the second base station.

In further embodiments, the techniques may include determining when a change to the beamsteering configuration of the drone will result in the reduction of signal interference by determining when a change to an antenna gain for the drone will result in the reduction of signal interference and updating the antenna gain in response to the determination. Likewise, determining when a change to the beamsteering configuration of the drone will result in the reduction of signal interference may include determining when a change to an antenna beamsteering direction for the drone will result in the reduction of signal interference and updating the antenna beamsteering direction in response to the determination.

Figure 1A:
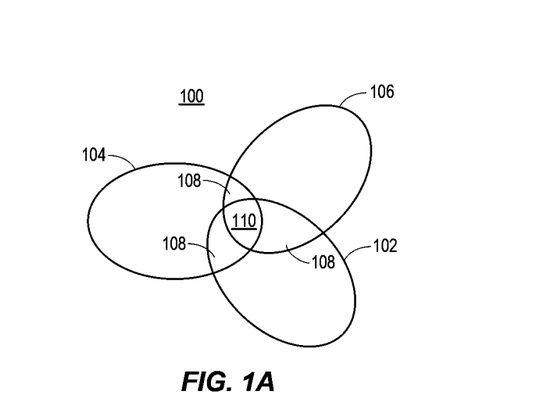
FIG. 1A illustrates an example radio coverage pattern generated by multiple base stations, as would be experienced by a mobile device positioned below the base station sightline (below clutter), in accordance with an example.

To provide background of a typical radio coverage example, FIG. 1A illustrates an example radio coverage scenario 100, for a cellular network. Three adjacent cells 102, 104, and 106, are shown, each corresponding to a different geographic area. These cells 102, 104, and 106 are part of a wireless communication network, such as cellular telecommunication network or wireless internet protocol network, configured from geographically fixed radio towers or other radio-wave propagating and receiving devices, also herein referred to as base stations. These base stations communicate bidirectionally with mobile devices such as cellular phones through radio signals in a specific communication protocol, such as "time division multiple access"

(TDMA, also part of GSM) or "code division multiple access" (CDMA) for cellular telecommunications, or TCP/IP for internet networks. In a TCP/IP protocol, the base stations may also dynamically assign network addresses to other communication devices that are using the network. Some base stations include equipment to support several types of multiple wireless networks, for example, both a GSM and CDMA network, or the cellular networks and a wireless internet network such as those using the WiMAX (IEEE 802.16) standard. The base stations may be configured to transmit data according to various standards, including Long Term Evolution (LTE)/Evolved Universal Mobile Telecommunications System (UMTS) Terrestrial Radio Access Network (E-UTRAN) protocol or new radio (NR)/5G protocol.

Figure 1B:
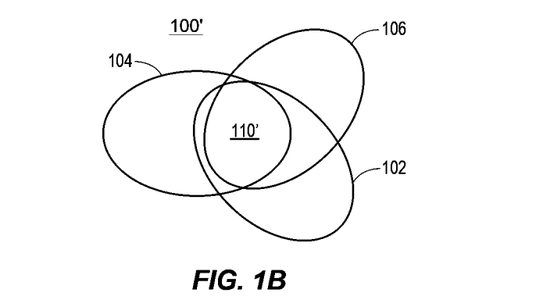
FIG. 1B illustrates an example radio coverage pattern generated by multiple base stations, as would be experienced by a mobile device above the base station sightline (above clutter), in accordance with an example.
Figure 1C:
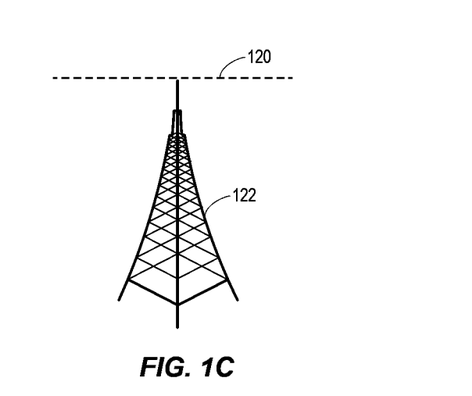
FIG. 1C illustrates a base station having a sightline, in accordance with an example.

The coverage scenario 100 in FIG. 1 represents the coverage experienced by the typical cellular phone or other device, which operates below a (clutter) sightline 120 of the base stations 122 (see, FIG. 1C) in the network. Each cell 102-106 has a large area of cell single dominance, i.e., a region where that cell provides the only coverage over that region such that mobile devices within that region will communicate with only with the associated base station. There are, however, overlapping cell coverage regions. In particular, three overlap regions 108 are shown in which overlap is between two adjacent cells. One overlap cell coverage region 110 is shown in which all three adjacent cells overlap. A mobile device in any of these overlap regions 108, 110 can potentially experience downlink interference from overlapping cells. Generally, mobile devices are assigned to a single serving cell and base station at a time, which means that mobile devices in these overlap regions may receive downlink signals from radio transceivers in base stations to which the mobile device is not assigned. That results in downlink interference, which the mobile device must compensate for through signal filtering. Because the scenario 100 is one experienced by cellular devices operating below the sightline 120 of the base station 122, the region 110, while not insignificant, is generally relatively small. Indeed, base station locations and heights are generally chosen to minimize overlap experienced by cellular phones.

FIG. 1B illustrates an example cell coverage scenario 100', resulting from the same base stations and cells 102, 104, 106, but that would be experienced by a cellular device traveling at or above the (clutter) sightline 120, for example, as would often be experienced by drones operating via the cellular network. In the scenario 100', the areas of single cell dominance for each cell 102-106 are much smaller than in scenario 100. The area of overlap for region 110', for example, has increased considerably. For devices, like drones, that maneuver above the sightline 120, the areas for potential uplink/downlink interference overlap can be quite large, as shown. Indeed, the areas of interference overlap can be greater than the areas of single cell dominance.

Figure 2A:
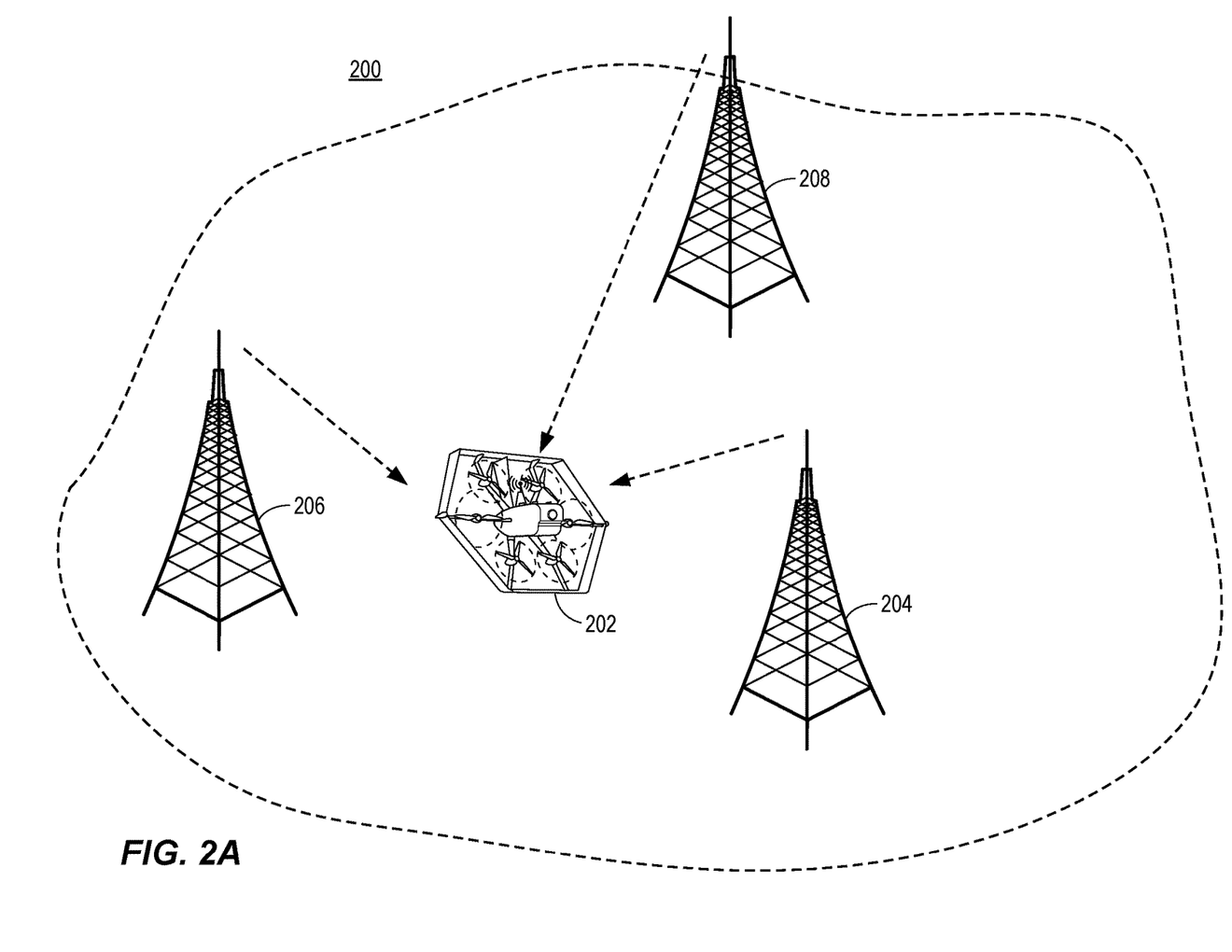
FIG. 2A illustrates an example radio coverage for a mobile device positioned below the base station sightline, in accordance with an example.
Figure 2B:
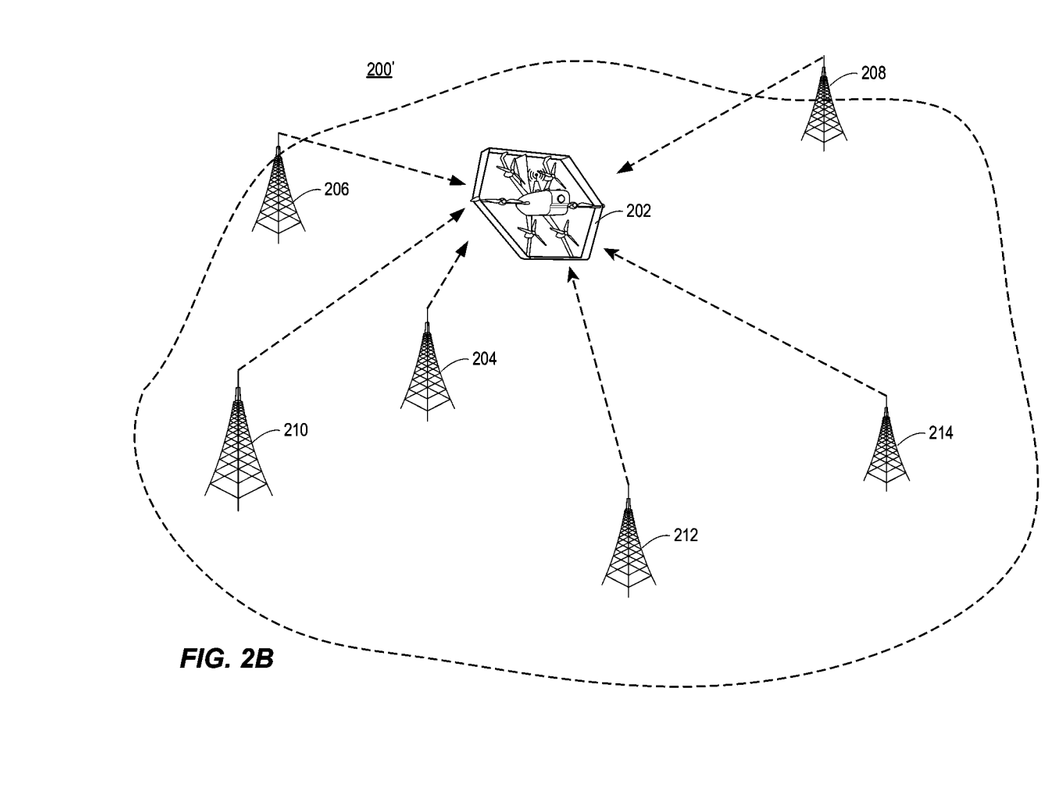
FIG. 2B illustrates an example radio coverage for a mobile device positioned above the base station sightline, in accordance with an example.

FIGS. 2A and 2B illustrate radio coverage scenarios 200 and 200' respectively, similar to radio coverage scenarios 100 and 100'. In the scenario 200, a drone 202 is positioned below the sightline of one or more mobile cellular base stations 204, 206, and 208. In the illustrated example, a radio transceiver of the drone 202 is able to communicate with any of the base stations 204, 206, and 208, but is further configured to communicate preferably with the base station to which it is assigned for bidirectional communication. Because the drone 202 is below the sightline, the overlap interference region (not shown) would be relatively small. In the scenario 200' (FIG. 2B), the drone 202 is above the sightlines of a plurality of base stations, including base stations 204, 206, and 208. But as the drone 202 travels in a flight path further above the sightline, the drone 202 may receive downlink signals, even if attenuated, from base stations 210, 212, and 214 which are substantially further away than base stations 204, 206, and 208. The increasing number of base stations results in increasing amounts of potential downlink interference.

Similar to problems of downlink interference, in the uplink path, data transmitter by the drone 202 can cause uplink interference with other drones transmitting to the same or other base stations using the same transmission frequencies or timeslots.

To address the problems, in examples herein, drones are configured to reduce uplink and downlink interference by combining beamforming techniques with gain control in the receive path of radio transceivers. Compared with mobile devices with omnidirectional antennas, drones with beamforming antennas having selective gain control are able to reduce interference on uplink and downlink paths by limiting interference from near and far base stations. In some examples, the directionality of amount (e.g., width) beamforming on a radio antenna of a drone may be adjusted to reduced uplink/downlink interference. The amount of radio antenna gain along the beamforming direction can be adjusted to prevent uplink/downlink interference with base stations further away. Further still, in some examples, the beamforming and gain control is not only adjustable in a horizontal flight path, but also as the drone flight path moves through different heights above the sightline.

Figure 3:
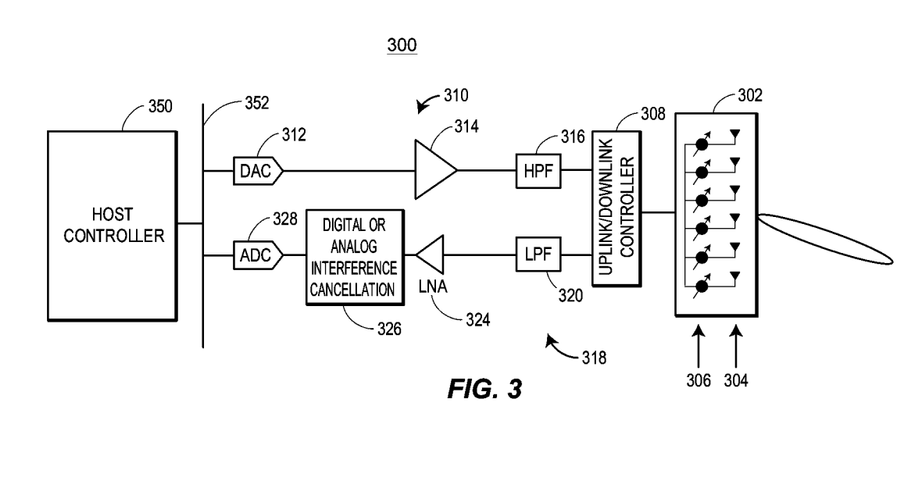
FIG. 3 is a block diagram of drone having a radio transceiver implementing an example uplink and downlink minimization, in accordance with an example.

FIG. 3 illustrates an example radio transceiver 300 for a drone configured to reduce uplink/downlink interference. The radio transceiver 300 includes an antenna assembly 302 which may be formed of one or more antennas, e.g., an antenna array. The antenna assembly 302 may be formed of one or more antennas, including linear antennas, omnidirectional antennas, planar antennas, etc. In various embodiments, such antennas may include electrically tunable antennas or mechanically repositionable fixed-direction antennas.

In the illustrated example, the antenna assembly 302 is formed of a plurality of antennas, each individually controllable for beamsteering. Collectively, these antennas can provide wide bidirectional communication coverage for the radio transceiver 300. In some examples, these antennas are formed from a beam steering array of antenna elements, where beam steering may be achieved through gain and phase control signals sent to antenna assembly 302 by a controller. In some examples, the antenna assembly 302 is formed of a plurality of individual beam steerable antenna elements, each directed in a different direction, such that the radio transceiver 300 can communicate over a 360° in-plane coverage region.

In the example illustrated in FIG. 3, the antenna assembly 302 is formed of six antennas 304 each having an individual phase controller and gain controller 306. Each antenna 304 may be individually controllable by an uplink/downlink controller 308, configured to provide gain control signals and beamforming control signals to the antenna assembly 302. The radio transceiver 300 includes a transmit signal path 310 formed for a digital to analog (DAC) converter 312, a line gain amplifier 314, and a high pass filter (HPF) 316 feeding a transmit signal to the uplink/downlink controller 308. A receive signal path 318 includes a low pass filter (LPF) 320 coupled to the controller 308, feeding a low-noise amplifier (LNA) 324 that feeds an interference cancellation controller 326, which is coupled to an analog to digital converter (ADC) 328. The controller 326 may use digital and/or analog cancellation techniques to further reduce the unwanted signals and magnifies wanted signals.

In the illustrated example, the radio transceiver 300 is configured as a communication front end of a drone and connected to a host processing device 350 through a communication bus 352 or other communication channel. The radio transceiver 300 may be implemented on a computer processing device having one or more processors and one or more memories. That computer processing device may be communicatively coupled to the host processing device 350 through the bus 352, such as a pluggable interface or other electronic connection.

In some examples, the host processing device 350 may be configured to perform processes associated with operation of the drone, such as navigation processes (including a global positioning system (GPS) controller) that identify positional data for the drone, a point of origin, and a point of destination. The host processing device 350 may include processes for controlling operation of the drone including monitoring on-board sensors, controlling actuators, motors, engines, propellers, servomotors, power/battery supplies, imagers, and other processes.

Figure 4A:
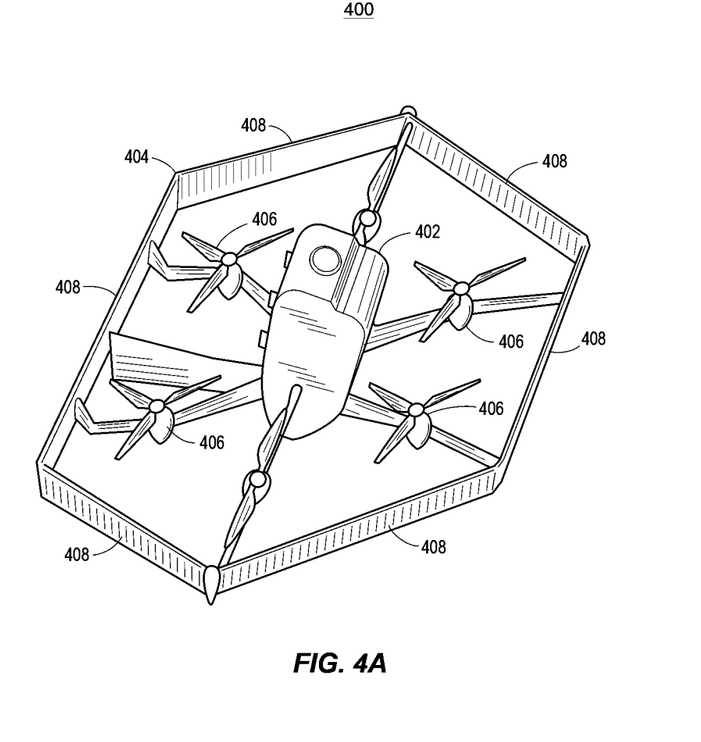
FIG. 4A illustrates a drone configured with uplink and downlink minimization and having a hexagonal antenna assembly, in accordance with an example.

FIG. 4A illustrates an example drone 400 formed of a body 402 defining an antenna assembly 404 and formed of a plurality of propeller assemblies 406 that affect movement of the drone over a flight path. The antenna assembly 404 may be externally mounted extending outwardly from the body 402. In the example shown, however, the body 402 is formed having a generally hexagonal frame shape, and the antenna assembly 404 is formed having each of its antennas corresponding to a different side of the hexagonal frame.

Figure 4B:
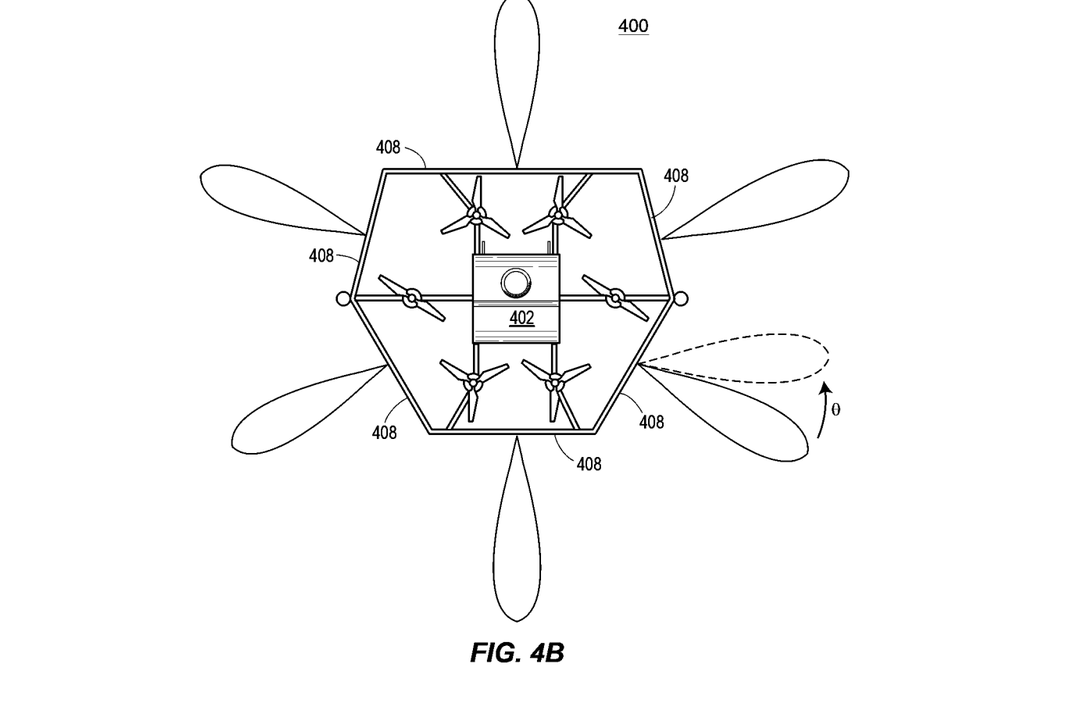
FIGS. 4B and 4C illustrate example beam lobes generated by planar antennas of the hexagonal antenna assembly, showing beam steering along azimuthal angles and altitude angles, respectively, in accordance with an example.
Figure 4C:
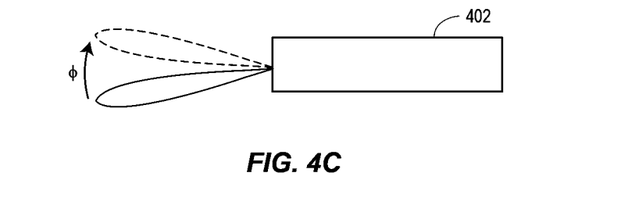

In this example of FIG. 4A, the antenna assembly 404 is formed of a plurality of antenna panels 408 each adjacent to a different hexagonal side of the body 402. Each antenna panel 408 is configured to receive and transmit over a beam steerable signal region in a primary direction relative to the drone 400, and each antenna panel is characterized by a separately controllable beamwidth and beam gain. Further, as shown, each panel antenna is configured to receive and transmit in a different direction. As such, collectively the antenna panels 408 are configured to provide the drone radio transceiver communication coverage over 360° in-plane. Example beamwidth profiles or different radio signal directions for the drone 400 are shown in FIG. 4B, from a top view. Further, each beamwidth generated by the panels 408 may be directionally tuned over a tuning range of horizontal angles, i.e., azimuthal angles (θ), shown by way of example (by the solid and dashed line beam patterns). Additionally, in some examples, the antenna panels 408 are configured to perform beam steering over a tuning range of vertical angles (φ) (shown in FIG. 4C), thereby allowing each panel 408 to tune its respective radio signal path over approximately a steradian of angles.

While the antenna assembly 404 is shown with antenna panels in hexagonal shape, any suitable shape providing 360° or near 360° beam coverage would be suitable, including any suitable regular polygon shape having n sides, where n is an integer equal to or greater than 3, and preferably where n is 6, 7, 8, 9, or 10.

Figure 5:
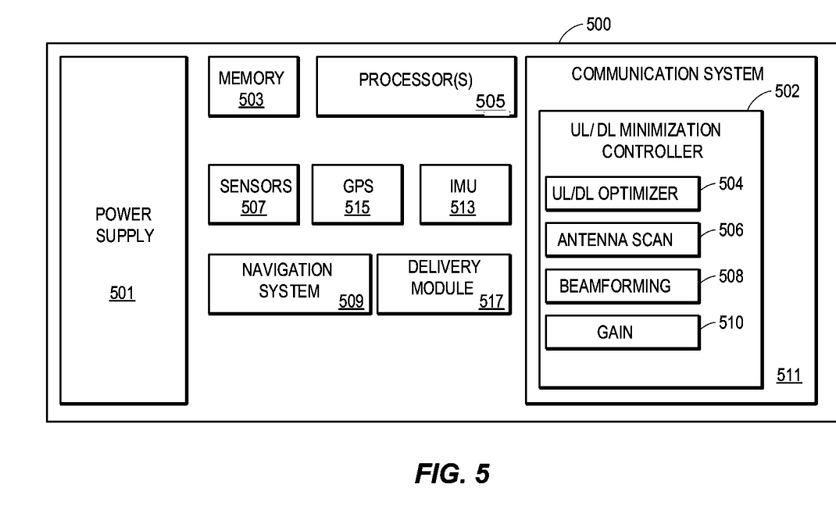
FIG. 5 is a block diagram of an example drone controller, in accordance with an example.

The body 402 may further include subsystems for operation of the drone, including a host controller, described in reference to FIG. 3 and FIG. 5. Further the body 402 contains a payload receptacle, not shown, for receiving a package or other physical item to be transported from a first location to a second location. In some examples, the payload receptacle is electronically controllable to release the payload upon receiving a control commend from the host controller, for example, when the drone has reached a delivery destination.

FIG. 5 illustrates an example drone controller 500 for a drone, such as a delivery drone capable of delivering packages from one destination to one or more delivery destinations. The drone controller 500 may include a power supply 501 (e.g., one or more batteries), a memory 503 (e.g., volatile memory and/or nonvolatile memory), processor(s) 505 for executing instructions and performing calculations, sensors 507, navigation system 509, communication system/radio transceiver 511, inertial measurement unit (IMU) 513, global positioning system (GPS) 515, and package evaluation & delivery module 517.

The processor(s) 505 may be the main processors of the drone and may include application processors, various coprocessors, and other dedicated processors for operating the drone in a delivery mode and a scanning mode. The processor(s) 505 may be communicably coupled with memory 503 and configured to run the operating system, user interfaces, sensors 507, navigation system 509, communication system 511, and/or other components. In some embodiments, processor(s) 505 may include multiple dedicated or shared processors configured to perform signal processing (e.g. baseband processors for cellular communications), implement/manage real-time radio transmission operations, make navigation decisions (e.g., compute flight paths, implement obstacle avoidance routines, etc.). These processors along with the other components may be powered by power supply 501. The volatile and nonvolatile memories found in various embodiments may include storage media for storing information such as processor-readable instructions, data structures, program modules, or other data.

The sensors 507 may be used to detect events or changes in the surrounding environment and produce a corresponding signal that can be acted upon by various components within the delivery drone or transmitted to other parts of the drone delivery infrastructure. In some examples, the sensors 507 may include one or more of the following: a microphone, a camera, a thermostat, an accelerometer, light sensors, motion sensors, moisture sensors, fingerprint readers, retinal scanners, chemical sensors, scales, LIDAR, RADAR, and the like. Several of these sensors, for example, may be used as part of navigation system 509. Other sensors may be used to evaluate the package or record the environment.

The navigation system 509 can be responsible for determining the flight path of the drone. In some embodiments, high-level instructions or pick-up/drop-off destinations can be communicated to the drone via communication system 511. Navigation system 509 may receive inputs from multiple sensors 507 (e.g., accelerometers, gyroscopes, LIDAR, RADAR, etc.), IMU 513, and/or GPS 515 to determine optimal flight paths, detect and avoid objects, coordinate with other nearby drones using communication system 511, and the like. For example, IMU 513 can determine the delivery drone's orientation and velocity. The delivery module 517 may perform operations associated with package delivery, including inventory control operations, purchasing operations, package identification operations, user authentication operations, etc.

In the illustrated example, the communication system 511 includes an uplink/downlink interference minimization controller 502. The minimization controller 502 may be implemented by a host controller (350), by a radio transceiver frontend (300), a combination of the two, or on a separate dedicated processing device. The minimization controller 502 includes an uplink/downlink optimizer 504, an antenna scan controller 506, a beamforming controller 508, and a gain controller 510. As described further herein, the uplink/downlink optimizer 504 may enter into an uplink/downlink scanning mode in which the optimizer 504 communicates with the antenna scan controller 506 to scan for downlink signals from base stations over a scan region using the antenna assembly (404). The antenna scan controller 506 may communicate with the beamforming controller 508 and the gain controller 510 to receive those downlink signals at the antenna assembly (404), where the received signals are analyzed by the uplink/downlink optimizer 502 which determines new beamforming and gain values and new serving cell for use by the antenna assembly (404) during a delivery mode of the drone.

In examples, drones are described has having a scanning mode, in which the drone scans for new downlink signals and determines if new beamforming, gain, and/or serving cells should be used. The drones further include a delivery mode, representing normal operation of the drone in following a flight path to move from a first destination to one or more other destinations. In some examples, drones will enter the scanning mode while maintaining the delivery mode, both modes operating simultaneously. However, in other examples, and to reduce power demands on the drone, the uplink/downlink minimization controller 502 switches the drone from the delivery mode to the scanning mode and back. In some examples, the scanning mode may be achieved in a time interval of sufficiently limited duration to maintain communication and control of the drone, thereby allowing for the flight path of the drone to be maintained without dropping connection to the current serving cell. In some examples, the scanning mode and the delivery mode are performed over the same frequency band. In some examples, the scanning mode and the delivery mode are performed over different frequency bands. Example frequency bands include mobile cellular frequency bands, such as 600 MHz band, 700 MHz band, 900 HMz band, 1700/2100 MHz band, 1900 MHz band, and 2400 MHz band. Additional or alternative bands may be used in other embodiments.

Figure 6:
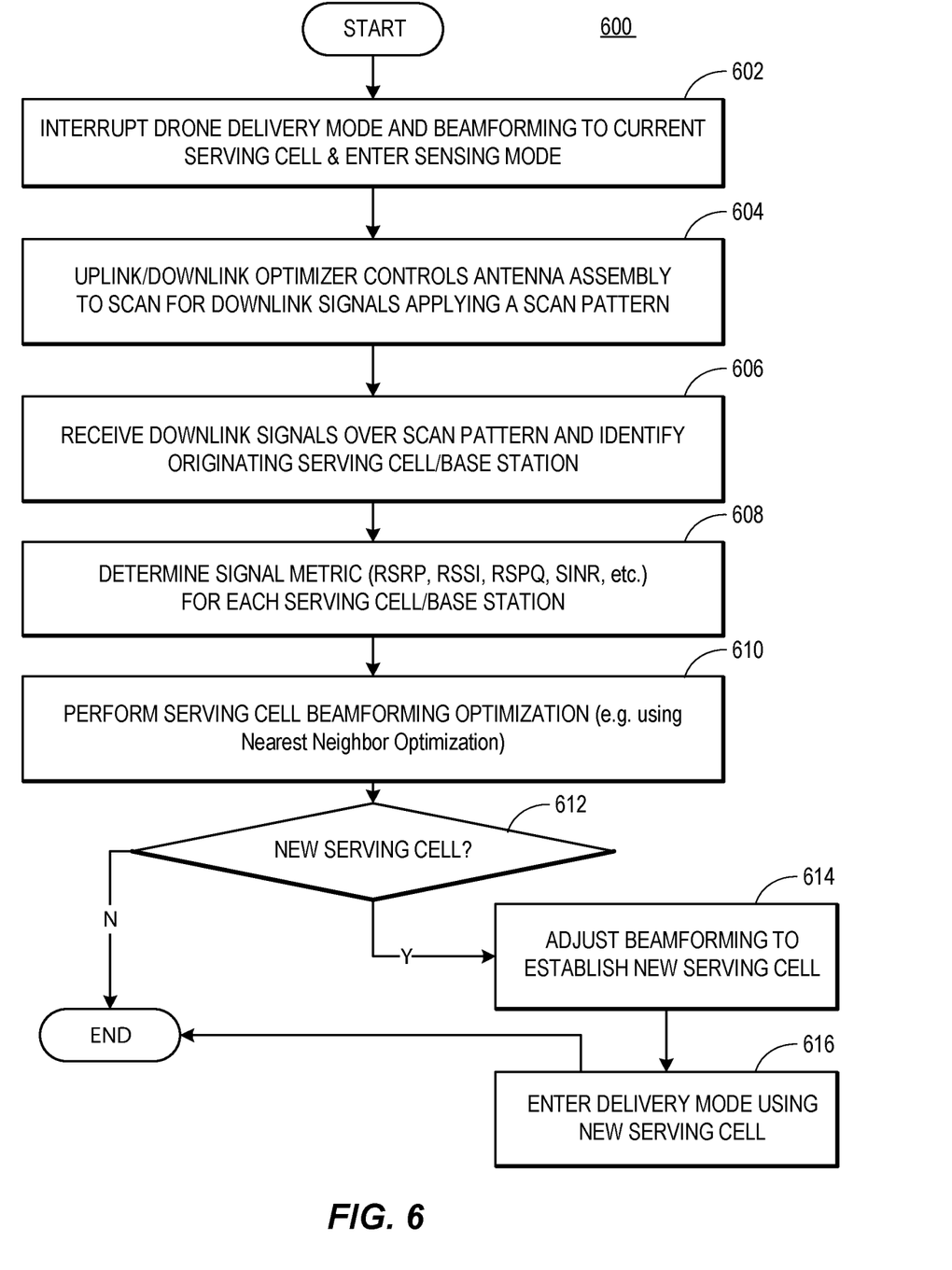
FIG. 6 illustrates a flow diagram of an interference minimization technique implemented by the drone of FIG. 3, in accordance with an example.

FIG. 6 illustrates an uplink/downlink interference minimization process 600 as may be performed by the controller 500 of FIG. 5. At a block 602, the uplink/downlink controller interrupts a delivery mode and enters the drone into a sensing mode. For example, at the block 602, the uplink/downlink controller may stop receiving a signal from the current serving cell by interrupting the radio transceiver from communicating with that serving cell. In the example configuration of drone 400, for example, the antenna panel primarily communicating with the serving cell may be switched to a non-receive/non-transmit mode.

At a block 604, the uplink/downlink controller then controls the antenna assembly to scan for downlink signals by applying a scan pattern to the radio transceiver. The scan pattern may be stored in the uplink/downlink controller and include the number of antenna panels in the antenna assembly and a scanning order for cycling through each antenna panel searching for a downlink signal received at the radio transceiver. In some examples, the scan pattern starts with an antenna panel next to the antenna panel associated with the current serving cell (e.g., the antenna panel switched to the non-receive/non-transmit mode), and the uplink/downlink controller controls the antenna assembly to scan each antenna panel until the panel associated with the current serving cell is reached and scanned as part of the sensing mode (for example, in a counterclockwise or clockwise rotating manner).

In some examples, the scan pattern includes not only a pattern representing the number of antenna panels in an antenna assembly, but also different azimuthal and altitudinal beamforming directions scanned by each of the panels. This allows for interference minimization by not only adjusting beamsteering and gain controls between antenna panels, but within each antenna panel.

In some examples, the scan patterns are determined based on the location of the drone. For example, drones following flight paths that increase the height of the drone above the base station line of sight may be configured to look for downlink signals at increasingly steeper, downwardly directly beamforming directions (altitudinal angles). In any event, the scan patterns can be predetermined or determined in real time, based on the flight pattern and/or position of the drone.

At a block 606, the antenna assembly obtains downlink signals for each of the antenna panels during this scanning and communicates those signals to the uplink/downlink optimizer. At a block 608, the uplink/downlink optimizer determines a reference signal received power (RSRP), received signal strength indicator (RSSI), reference signal received quality (RSRQ), or signal-to-interference-plus-noise ratio (SINR) for each downlink signal received from each antenna panel. The block 608 may perform signal filtering on the received signals as part of this processing. These signals represent a signal quality characteristic for each received downlink signal. At a block 610, the uplink/downlink controller performs a serving cell optimization, for example, by performing a nearest neighbor optimization using the received RSRP, RSSI, RSRQ, or SINR signals. The result of the serving cell optimization is a determination of whether the drone is near enough to another base station to have a new serving cell, as determined at block 612. If a new serving cell is determined, then beamforming adjustments are made (at block 614) so that the drone communicates with the base station corresponding to the new serving cell in the delivery mode (block 616). The scanning mode is terminated and the drone is re-entered into the drone delivery mode and the process 600 can start all over again the next scan period.

Figure 7:
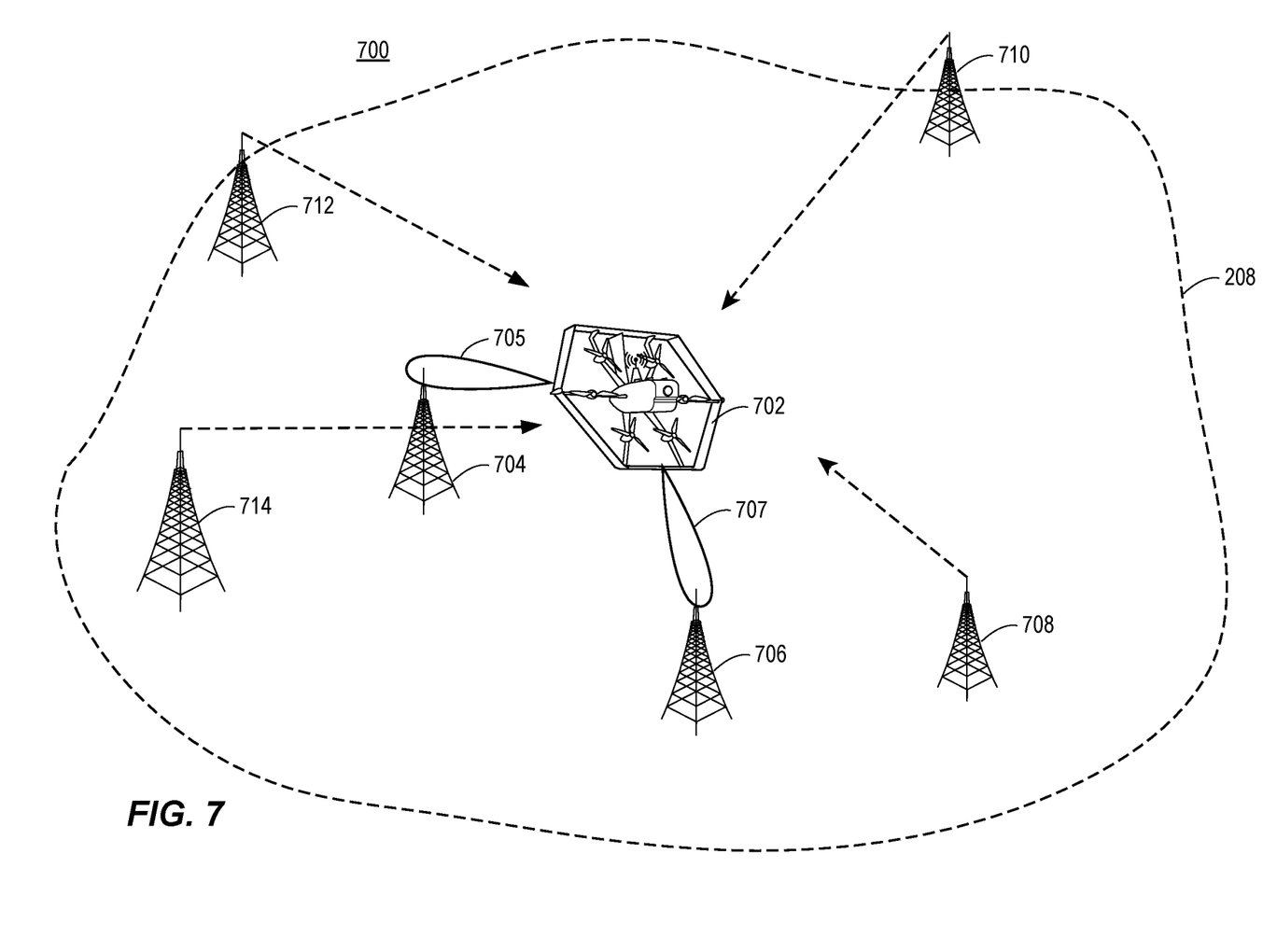
FIG. 7 illustrates a radio transceiver interference minimization example as may be implemented by the process of FIG. 6, in accordance with an example.

FIG. 7 illustrates an example cell coverage scenario 700 for a drone 702 implementing the process 600. The drone 702 is initially served by a base station 704 and corresponding serving cell, i.e., this is the serving cell during the current drone delivery mode on which the drone communicates by applying a first beamforming pattern 705.

When the drone 702 enters into the scanning mode, the drone 702 searches for downlink signals from different directions, resulting in downlink signals from a plurality of different base stations 706, 708, 710, 712, and 714. The drone 702 searches for downlink signals by scanning across each of the antenna planes for the antenna assembly. Some of the received signals may include multiple downlink signals, from different base stations. The drone 702 is configured to identify the originating base stations for each of the received downlink signals, along the different scan directions. In any event, the drone 702 determines an RSRP, RSSI, RSRQ, or SINR for each downlink signal from each base station, and then performs an optimization, such as a nearest neighbor optimization, to determine if a new serving cell is better optimized for the drone 702, to minimize uplink/downlink interference in comparison to that experienced by the drone when using the base station 704. In the illustrated example, a new serving cell corresponding to base station 706 has been identified. The drone 702 then performs beamforming adjustments to communicate with the base station 706 during the normal drone delivery mode, which the drone 702 switches back into after the aforementioned optimization process cycle is completed. An example second beamforming pattern 707 that corresponds to a lower uplink/downlink interference for the drone is shown.

Figure 8:
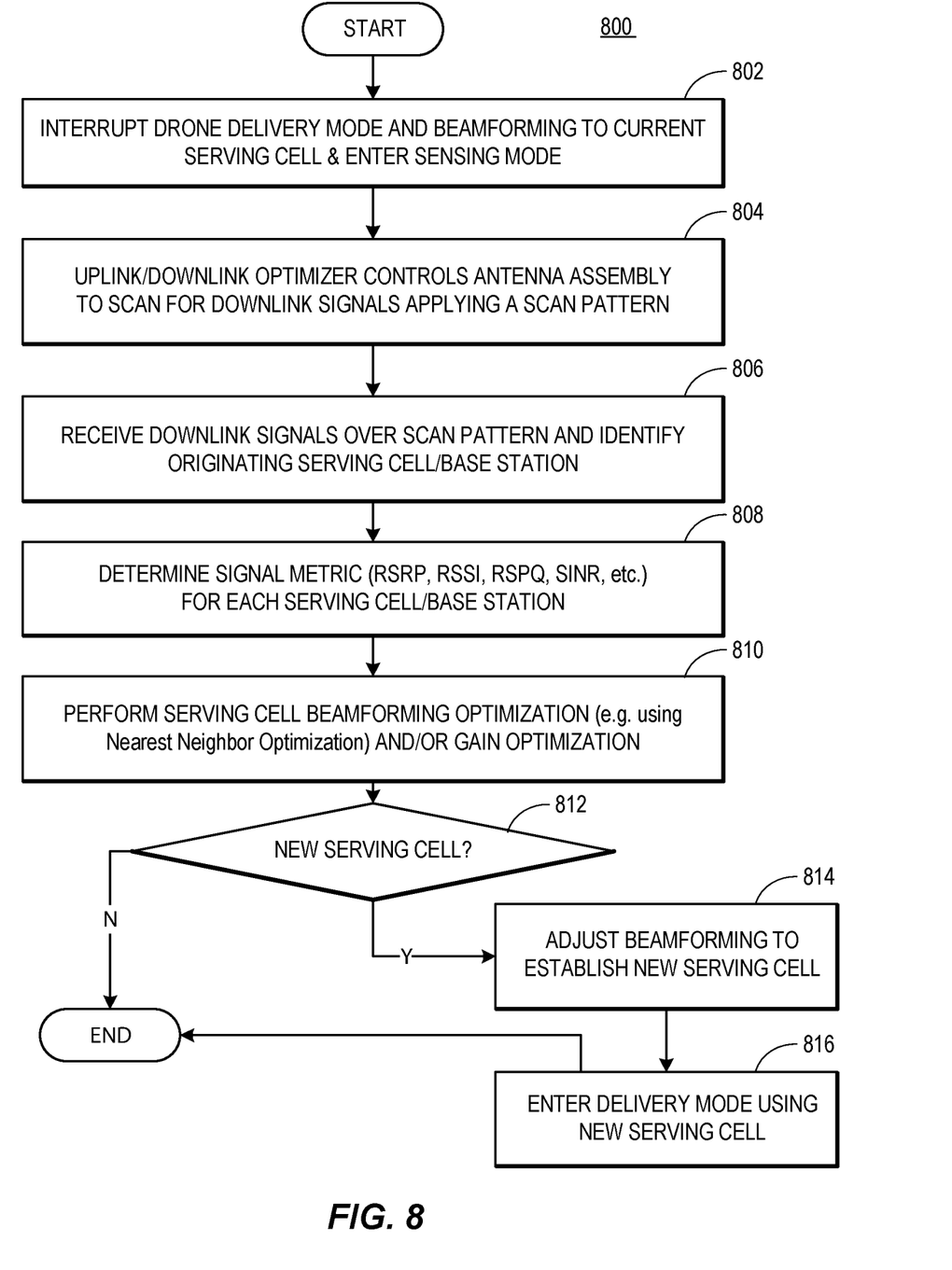
FIG. 8 illustrates a flow diagram of another example interference minimization technique implemented by the drone of FIG. 3, in accordance with an example.

FIG. 8 shows an uplink/downlink interference minimization process 800 similar to the process 600, but that includes additional optimization to minimize interference. The process 800, which may be performed by uplink/downlink interference minimization controller 502 includes similar functionality to that of process 600, therefore like blocks 802, 804, 806, and 808 (corresponding to blocks 602, 604, 606, and 608, respectively) are not further described. However, the process 800 further includes gain optimization in addition to beamforming optimization of process 600. At block 810, the uplink/downlink controller performs a serving cell optimization, for example, by performing a nearest neighbor optimization using received RSRP, RSSI, RSRQ, or SINR signals. The result of the serving cell optimization is a determination of whether the drone is near enough to another base station to have a new serving cell, as determined at block 812. The optimization of block 810 may determine whether or not to use a new serving cell for the drone delivery mode, but additionally whether the gain profile used by the radio transceiver beamformer during the delivery mode can be further optimized by adjusting the amplifier gain. This gain optimization may also be based on the received downlink signals during the scanning mode, for example. For example, this gain optimization may look at the signal strengths (or SINR) for the different received downlink signals and use those signal strengths to determine if the gain profile for the radio signal beamsteering should be increased or decreased to reduce either or both uplink interference and/or downlink interference. In some examples, a gain optimization algorithm may determine if increasing or decreasing beam gain will decrease uplink/downlink interference. For example, reducing the gain may be beneficial in limiting the interference from distant base stations.

In some examples, such gain optimization may be performed separately from the beamforming optimization algorithm process. In some examples, gain optimization is performed before beamforming optimization, where the uplink/downlink interference minimization controller determines if a sufficient improvement in interference minimization can be achieved from the gain optimization alone, in which case the uplink/downlink interference minimization controller may switch from the scanning mode back to the drone delivery mode without entering the beamforming optimization at block 810. If sufficient optimization has not occurred, then the beamforming optimization may be performed. In some examples, the uplink/downlink interference minimization controller may enter the beamforming optimization first, and determine if that optimization achieves sufficient reduction in interference, and otherwise enter the gain optimization mode.

In some examples, however, the beamforming optimization and the gain optimization are performed simultaneously, for example, using a two constraint optimization process, to produce a new beamforming and gain profile for the main beam lobe used during the drone delivery mode.

Figure 9:
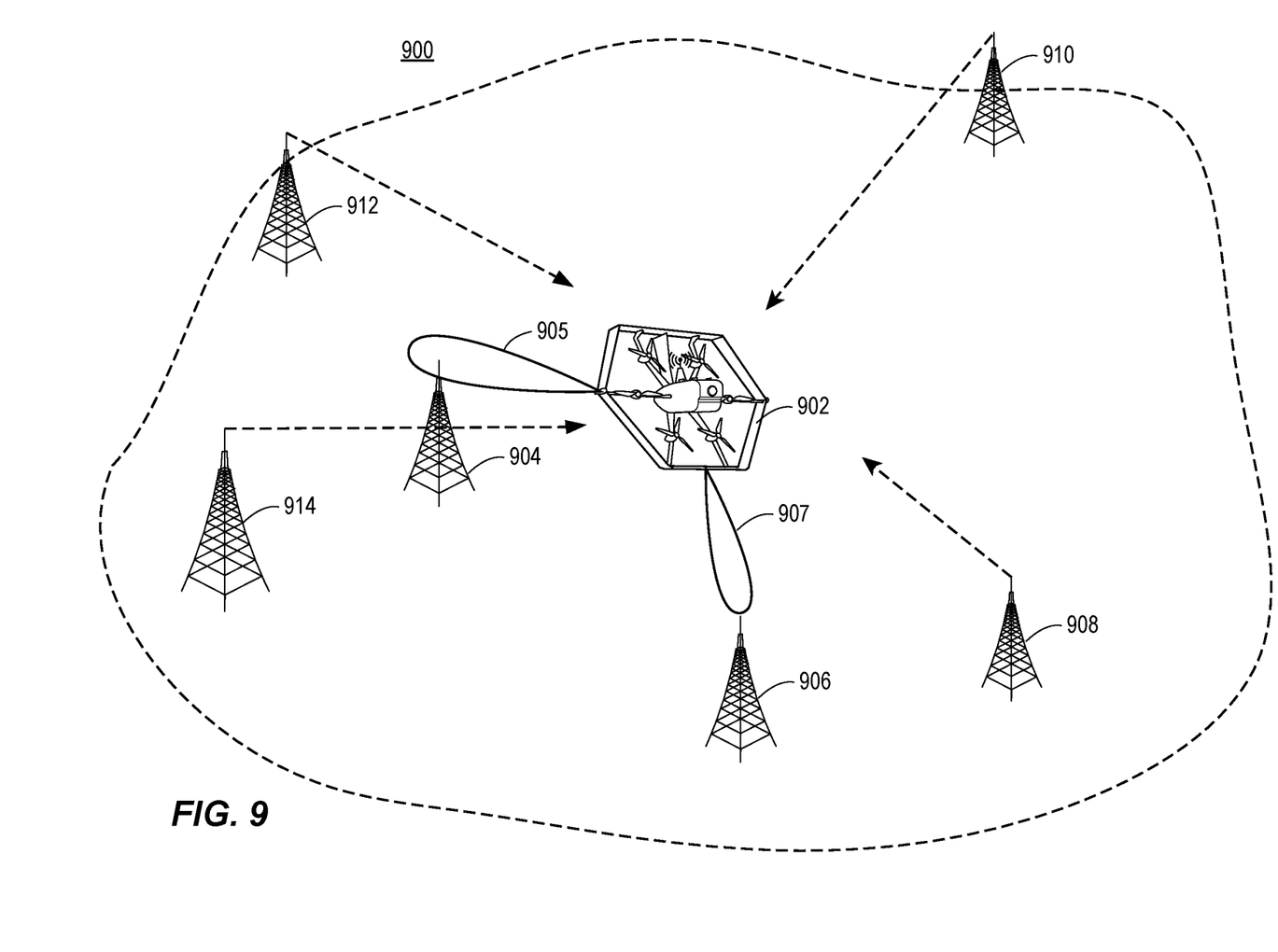
FIG. 9 illustrates a radio transceiver interference minimization example as may be implemented by the process of FIG. 8, in accordance with an example.

FIG. 9 illustrates an example cell coverage scenario 900 for a drone 902 implementing the process 800. The drone 902 is initially served by a cell corresponding to base station 904. This is the serving cell during the current drone delivery mode. When the drone 902 enters into the scanning mode, the drone 902 searches for downlink signals from different directions, resulting in downlink signals from a plurality of different base stations 906, 908, 910, 912, and 914. The drone 902, applying the process 800, identifies the base station 906 and the corresponding serving cell as the new serving cell, resulting in a new beamforming configuration for the drone, from configuration 905 to configuration 907. The drone 902, however, has further minimized uplink/downlink interference within the serving cell for base station 906 by adjusting the gain profile on the beamsteering configuration 907, in this case by reducing the antenna gain applied by the antenna assembly.

The embodiments described above may be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly, impliedly, or inherently set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be any of X, Y, or Z, or any combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

Finally, the patent claims at the end of this patent application are not intended to be construed under 35 U.S.C. §

112(f), unless traditional means-plus-function language is expressly recited, such as "means for" or "step for" language being explicitly recited in the claims.

What is claimed is:

1. A computer-implemented method for minimizing signal interference of a drone operating on a cellular network, the method comprising:
    scanning, by one or more antennas of the drone, for a plurality of downlink signals, each received downlink signal being received from a different base station of the cellular network, each base station defining a serving cell for the cellular network;
    determining, by one or more processors of the drone, a downlink signal characteristic for each of the plurality of downlink signals received at the drone;
    performing, by one or more processors of the drone, a downlink interference minimization process using the downlink signal characteristics of the plurality of downlink signals received at the drone; and
    in response to performing the downlink interference minimization process, determining, by the one or processors of the drone, when a change to a beamsteering configuration of the drone will result in a reduction of signal interference and updating the beamsteering configuration in response to the determination.

2. The computer-implemented method of claim 1, wherein the drone is configured with a delivery mode in which the drone is configured for bidirectional communication with a first base station using a first beamsteering configuration, the method further comprising:
    switching, by the one or more processors of the drone, the drone to a scanning mode, in which scanning for the plurality of downlink signals is performed, and
    wherein updating the beamsteering configuration configures the drone for bidirectional communication with a second base station, different than the first base station using a second beamsteering configuration.

3. The computer-implemented method of claim 2, wherein updating the beamsteering configuration comprises switching a beamsteering configuration of a radio transceiver of the drone from a first antenna panel corresponding to a first primary direction to a second antenna panel corresponding to a second primary direction different than the first primary direction.

4. The computer-implemented method of claim 2, wherein performing the downlink interference minimization comprises:
    performing a nearest neighbor optimization on the plurality of downlink signals received from the different base stations to identify the second base station.

5. The computer-implemented method of claim 1, wherein determining when a change to the beamsteering configuration of the drone will result in the reduction of signal interference comprises:
    determining when a change to an antenna gain for the drone will result in the reduction of signal interference and updating the antenna gain in response to the determination.

6. The computer-implemented method of claim 1, wherein determining when a change to the beamsteering configuration of the drone will result in the reduction of signal interference comprises:
    determining when a change to an antenna beamsteering direction for the drone will result in the reduction of signal interference and updating the antenna beamsteering direction in response to the determination.

7. The computer-implemented method of claim 1, wherein the downlink signal characteristic is reference signal received power (RSRP), received signal strength indicator (RSSI), reference signal received quality (RSRQ), or signal-to-interference-plus-noise ratio (SINR).

8. A non-transitory, tangible computer-readable medium storing machine readable instructions for minimizing signal interference of a drone operating on a cellular network that, when executed by one or more processors of the drone, cause the one or more processors to:
    scan for a plurality of downlink signals, each received downlink signal being received from a different base station of the cellular network, each base station defining a serving cell for the cellular network;
    determine a downlink signal characteristic for each of the plurality of downlink signals received at the drone;
    perform a downlink interference minimization process using the downlink signal characteristics of the plurality of downlink signals received at the drone; and
    in response to performing the downlink interference minimization process, determine when a change to a beamsteering configuration of the drone will result in a reduction of signal interference and update the beamsteering configuration in response to the determination.

9. The non-transitory, tangible computer-readable medium of claim 8, wherein the drone is configured with a delivery mode in which the drone is configured for bidirectional communication with a first base station using a first beamsteering configuration, wherein the machine readable instructions, when executed by the one or more processors of the drone, further cause the one or more processors to:
    switch the drone to a scanning mode, in which scanning for the plurality of downlink signals is performed, and
    wherein the instructions to update the beamsteering configuration further include instructions that configure the drone for bidirectional communication with a second base station, different than the first base station using a second beamsteering configuration.

10. The non-transitory, tangible computer-readable medium of claim 9, wherein the machine readable instructions, when executed by the one or more processors of the drone, further cause the one or more processors to:
    update the beamsteering configuration by switching a beamsteering configuration of a radio transceiver of the drone from a first antenna panel corresponding to a first primary direction to a second antenna panel corresponding to a second primary direction different than the first primary direction.

11. The non-transitory, tangible computer-readable medium of claim 9, wherein the machine readable instructions to perform the downlink interference minimization include instructions that, when executed by the one or more processors of the drone, further cause the one or more processors to:
    perform a nearest neighbor optimization on the plurality of downlink signals received from the different base stations to identify the second base station.

12. The non-transitory, tangible computer-readable medium of claim 8, wherein the machine readable instructions to determine when a change to the beamsteering configuration of the drone will result in the reduction of signal interference include instructions, when executed by the one or more processors of the drone, further cause the one or more processors to:

determine when a change to an antenna gain for the drone will result in the reduction of signal interference and update the antenna gain in response to the determination.

13. The non-transitory, tangible computer-readable medium of claim 8, wherein the machine readable instructions to determine when a change to the beamsteering configuration of the drone will result in the reduction of signal interference include instructions that, when executed by the one or more processors of the drone, further cause the one or more processors to:
determine when a change to an antenna beamsteering direction for the drone will result in the reduction of signal interference and update the antenna beamsteering direction in response to the determination.

14. The non-transitory, tangible computer-readable medium of claim 8, wherein the downlink signal characteristic is reference signal received power (RSRP), received signal strength indicator (RSSI), reference signal received quality (RSRQ), or signal-to-interference-plus-noise ratio (SINR).

15. A system for minimizing signal interference of a drone operating on a cellular network, the system comprising:
one or more processors;
a memory storing machine readable instructions that, when executed by the one or more processors, cause the system to:
scan for a plurality of downlink signals, each received downlink signal being received from a different base station of the cellular network, each base station defining a serving cell for the cellular network;
determine a downlink signal characteristic for each of the plurality of downlink signals received at the drone;
perform a downlink interference minimization process using the downlink signal characteristics of the plurality of downlink signals received at the drone; and
in response to performing the downlink interference minimization process, determine when a change to a beamsteering configuration of the drone will result in a reduction of signal interference and update the beamsteering configuration in response to the determination.

16. The system of claim 15, wherein the machine readable instructions, when executed by the one or more processors, further cause the system to:
control the drone in a delivery mode in which the drone is configured for bidirectional communication with a first base station using a first beamsteering configuration, wherein the machine readable instructions, when executed by the one or more processors of the drone, further cause the one or more processors to:
switch the drone to a scanning mode, in which scanning for the plurality of downlink signals is performed, and
wherein the instructions to update the beamsteering configuration further include instructions that configure the drone for bidirectional communication with a second base station, different than the first base station using a second beamsteering configuration.

17. The system of claim 16, wherein the machine readable instructions, when executed by the one or more processors, cause the system to:
update the beamsteering configuration by switching a beamsteering configuration of a radio transceiver of the drone from a first antenna panel corresponding to a first primary direction to a second antenna panel corresponding to a second primary direction different than the first primary direction.

18. The system of claim 16, wherein the machine readable instructions to perform the downlink interference minimization include instructions that, when executed by the one or more processors, cause the system to:
perform a nearest neighbor optimization on the plurality of downlink signals received from the different base stations to identify the second base station.

19. The system of claim 15, wherein the machine readable instructions to determine when a change to the beamsteering configuration of the drone will result in the reduction of signal interference include instructions, when executed by the one or more processors, cause the system to:
determine when a change to an antenna gain for the drone will result in the reduction of signal interference and update the antenna gain in response to the determination.

20. The system of claim 15, wherein the machine readable instructions to determine when a change to the beamsteering configuration of the drone will result in the reduction of signal interference include instructions that, when executed by the one or more processors, cause the system to:
determine when a change to an antenna beamsteering direction for the drone will result in the reduction of signal interference and update the antenna beamsteering direction in response to the determination.

\* \* \* \* \*